(12) United States Patent
Shiotani et al.

(10) Patent No.: US 8,586,656 B2
(45) Date of Patent: Nov. 19, 2013

(54) INK COMPOSITION FOR INKJET PRINTING

(75) Inventors: Toshihiko Shiotani, Tochigi (JP);
Tetsuo Sugawa, Tochigi (JP); Takehiro Kotera, Tochigi (JP); Yusuke Mizutaki, Tochigi (JP); Mikio Kuwahara, Tochigi (JP); Kenji Hayashi, Tochigi (JP); Hiroki Hayashi, Tochigi (JP); Shuji Sano, Tochigi (JP); Tsuneo Shirota, Tochigi (JP); Katsutaka Nakatsu, Tochigi (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 252 days.

(21) Appl. No.: 12/836,005

(22) Filed: Jul. 14, 2010

(65) Prior Publication Data

US 2010/0280158 A1 Nov. 4, 2010

Related U.S. Application Data

(62) Division of application No. 11/660,445, filed as application No. PCT/JP2005/009080 on May 18, 2005, now abandoned.

(30) Foreign Application Priority Data

| Aug. 19, 2004 | (JP) | 2004-240013 |
| Aug. 19, 2004 | (JP) | 2004-240014 |

(51) Int. Cl.
*C08K 5/15* (2006.01)

(52) U.S. Cl.
USPC .................... 524/107; 523/160; 523/161

(58) Field of Classification Search
USPC .................................. 523/160, 161
See application file for complete search history.

(56) References Cited

U.S. PATENT DOCUMENTS

2004/0266907 A1* 12/2004 Sugita et al. .............. 523/160
2004/0266912 A1 12/2004 Aida et al.

FOREIGN PATENT DOCUMENTS

| EP | 1134265 | 9/2001 |
| EP | 1174475 | 1/2002 |
| JP | 5-295310 | 11/1993 |
| JP | 7-109430 | 4/1995 |
| JP | 7-109431 | 4/1995 |
| JP | 2001-152058 | 6/2001 |
| JP | 2003-128960 | 5/2003 |
| JP | 2005-23099 | 1/2005 |
| JP | 2005-36199 | 2/2005 |
| JP | 2005-120225 | 5/2005 |
| JP | 2005-200469 | 7/2005 |
| JP | 2005-330298 | 12/2005 |
| WO | 96/21703 | 7/1996 |
| WO | WO 00/20521 | 4/2000 |
| WO | WO 2004/007626 * | 1/2004 |
| WO | 2006/134924 | 12/2006 |

OTHER PUBLICATIONS

Japanese Official Action—2007-153257—Nov. 10, 2010.

* cited by examiner

*Primary Examiner* — Doris Lee
(74) *Attorney, Agent, or Firm* — Young & Thompson

(57) ABSTRACT

An ink composition for ink-jet printing does not cause clogging of nozzles of an ink-jet printer during printing, thereby providing a print of desired printing quality; which ensures an appropriate drying rate of printed images; and which attains excellent color development. The ink composition for ink-jet printing, containing a pigment, a binder resin, a pigment dispersant, and a solvent, wherein the solvent is formed of (1) at least one glycol ether and at least one of a lactone compound and 2-pyrrolidone, or (2) at least one glycol ether acetate and at least one of cyclohexane and isophorone.

4 Claims, No Drawings

INK COMPOSITION FOR INKJET PRINTING

TECHNICAL FIELD

The present invention relates to an ink composition for ink-jet printing and, more particularly, to an ink composition for ink-jet printing which does not cause clogging of nozzles of an ink-jet printer during printing, to thereby provide a print of desired printing quality; which ensures an appropriate drying rate of printed images; and which attains excellent color development.

BACKGROUND ART

Hitherto, various pigment ink compositions for ink-jet printing employing a variety of solvents have been proposed. When prints are produced through printing by means of a ink-jet printer employing such a pigment ink composition, in some cases, nozzles of the printer are clogged, thereby providing prints of poor printing quality. In addition, color development of prints obtained by use of such a pigment ink composition is not always satisfactory.

DISCLOSURE OF THE INVENTION

The present invention has been conceived in order to solve the aforementioned problems, and an object of the present invention is to provide an ink composition for ink-jet printing which does not cause clogging of nozzles of an ink-jet printer during printing, to thereby provide a print of desired printing quality; which ensures an appropriate drying rate of printed images; and which attains excellent color development.

The present inventors have carried out extensive studies in order to attain the aforementioned object, and have found that an excellent ink composition for ink-jet printing can be produced through employment of a solvent having a predetermined composition. The present invention has been accomplished on the basis of this finding.

Accordingly, the present invention provides an ink composition for ink-jet printing, comprising a pigment, a binder resin, a pigment dispersant, and a solvent, characterized in that the solvent is formed of (1) at least one glycol ether and at least one of a lactone compound and 2-pyrrolidone, or (2) at least one glycol ether acetate and at least one of cyclohexane and isophorone.

BEST MODES FOR CARRYING OUT THE INVENTION

The ink composition of the present invention for ink-jet printing will next be described in detail.

In the ink composition of the present invention for ink-jet printing, it is essential that the solvent employed is formed of (1) at least one glycol ether and at least one of a lactone compound and 2-pyrrolidone, or (2) at least one glycol ether acetate and at least one of cyclohexane and isophorone. The amount of the solvent mixture, which is determined in consideration of factors such as viscosity and surface tension of the ink composition, is generally 60 to 99 mass % on the basis of the ink composition, preferably 80 to 97 mass %. In the case where at least one glycol ether is employed, the amount thereof is 15 to 95 mass % on the basis of the ink composition, preferably 55 to 85 mass %, and at least one of a lactone compound and 2-pyrrolidone is used in an amount of 1 to 45 mass % on the basis of the ink composition, preferably 10 to 25 mass %. In the case where at least one glycol ether acetate is employed, the amount thereof is 15 to 90 mass % on the basis of the ink composition, preferably 55 to 85 mass %, and at least one of cyclohexanone and isophorone is used in an amount of 0.5 to 30 mass % on the basis of the ink composition, preferably 1 to 25 mass %.

Examples of the glycol ether employed in the present invention include ethylene glycol ethers such as ethylene glycol monomethyl ether, ethylene glycol monobutyl ether, diethylene glycol monomethyl ether, ethylene glycol diethyl ether, diethylene glycol dimethyl ether, diethylene glycol ethyl methyl ether, diethylene glycol diethyl ether, and triethylene glycol monobutyl ether; propylene glycol ethers such as propylene glycol monomethyl ether, propylene glycol monoethyl ether, propylene glycol monobutyl ether, dipropylene glycol monomethyl ether, dipropylene glycol monoethyl ether, propylene glycol dimethyl ether, dipropylene glycol dimethyl ether, propylene glycol diethyl ether, and dipropylene glycol diethyl ether; and mixtures thereof.

Examples of the lactone compound employed in the present invention include γ-butyrolactone, γ-valerolactone, γ-caprolactone, ε-valerolactone, and mixtures thereof.

Examples of the glycol ether acetate employed in the present invention include ethylene glycol ether acetates such as ethylene glycol monoethyl ether acetate, diethylene glycol monoethyl ether acetate, and ethylene glycol monobutyl ether acetate; and propylene glycol ether acetates such as propylene glycol monomethyl ether acetate, propylene glycol monoethyl ether acetate, dipropylene glycol monomethyl ether acetate, dipropylene glycol monoethyl ether acetate; and mixtures thereof.

Similar to conventional printing ink compositions, the ink composition of the present invention for ink-jet printing contains a binder resin. No particular limitation is imposed on the type of the binder resin, and any binder resins employed in conventional ink compositions for ink-jet printing may be used. In the present invention, the binder resin is particularly preferably vinyl chloride copolymer resin. Such vinyl chloride copolymer resin may be used singly or in combination with other resins. The amount of the binder resin, which is determined in consideration of factors such as fixability, viscosity and surface tension of the ink composition, is generally 0.5 to 15 mass % on the basis of the ink composition, preferably 1 to 10 mass %.

In the present invention, a variety of vinyl chloride resins may be employed. Specific examples include vinyl chloride copolymer resins with other co-monomers such as vinyl acetate, vinylidene chloride, acrylic monomer, and maleic acid. A preferred vinyl chloride copolymer resin is a vinyl chloride-vinyl acetate copolymer resin formed through copolymerization of vinyl chloride and vinyl acetate, and such a copolymer resin having a molecular weight of 30,000 or less is particularly preferred.

No particular limitation is imposed on the type of the aforementioned other resins, and any resins employed in conventional ink compositions may be used. Examples of the resins include epoxy resin, phenolic resin, novolak resin, acrylic resin, rosin-modified phenolic resin, polyester resin, amino resins (melamine resin, benzoguanamine resin, etc.), polyamide resin, cellulose ester resins (cellulose diacetate, cellulose triacetate, nitrocellulose, cellulose nitrate, cellulose propionate, cellulose acetate butyrate, etc.), cellulose ether resins (methyl cellulose, ethyl cellulose, benzyl cellulose, trityl cellulose, cyanoethyl cellulose, carboxymethyl cellulose, carboxyethyl cellulose, aminoethyl cellulose, etc.), and vinyl acetate copolymer resins.

Examples of the pigment employed in the ink composition of the present invention for ink-jet printing include Pigment Yellow 12, 13, 14, 17, 20, 24, 31, 55, 74, 83, 86, 93, 109, 110, 117, 125, 128, 129, 137, 138, 139, 147, 148, 150, 153, 154, 155, 166, 168, 180, 181, and 185; Pigment Orange 16, 36, 38, 43, 51, 55, 59, 61, 64, 65, and 71; Pigment Red 9, 48, 49, 52, 53, 57, 97, 122, 123, 149, 168, 177, 180, 192, 202, 206, 215, 216, 217, 220, 223, 224, 226, 227, 228, 238, 240, 244, and 254; Pigment Violet 19, 23, 29, 30, 32, 37, 40, and 50; Pigment Blue 15, 15:1, 15:3, 15:4, 15:6, 22, 30, 64, and 80; Pigment Green 7 and 36; Pigment Brown 23, 25, and 26; Pigment black 7, 26, 27, and 28; titanium oxide; iron oxide; ultramarine; chrome yellow; zinc sulfide; cobalt blue; barium sulfate; calcium carbonate, etc. The amount of pigment incorporated into the composition, which may be arbitrarily determined depending on the type and other properties of the pigment employed, is generally 0.1 to 15 mass % on the basis of the ink composition, preferably 0.5 to 10 mass %.

Examples of the pigment dispersant employed in the ink composition of the present invention for ink-jet printing include a polyester-polyamide resin having two or more amido groups in the one molecule thereof and a number-average molecular weight of 2,000 to 15,000. The amount of the pigment dispersant incorporated into the composition, which may be determined depending on the type and other properties of the pigment employed, is generally 0.1 to 15 mass % on the basis of the ink composition, preferably 0.5 to 10 mass %.

A typical example of the pigment dispersant is produced through reaction of an acid-terminated polyester resin with a polyamine compound having two or more amino groups in the one molecule thereof. Specific examples include Solsperse 32000, Solsperse 32500, Solsperse 32600, Solsperse 33500, Solsperse 34750, Solsperse 35100, Solsperse 37500, and Disperbyk 9077.

A polyester-polyamide resin having one or no amido group in the one molecule thereof is not preferred, since pigment dispersion is poor. In addition, when the number-average molecular weight is less than 2,000, stable dispersion of pigment cannot be attained, whereas when the number-average molecular weight is in excess of 15,000, dispersibility of the pigment in ink tends to decrease.

The ink composition of the present invention for ink-jet printing may further contain a conductivity-controlling agent. The amount of the conductivity-controlling agent incorporated into the composition is generally 0.1 to 10 mass % on the basis of the ink composition, preferably 0.5 to 5 mass %.

Similar to conventional ink compositions for ink-jet printing, the ink composition of the present invention must have printing characteristics suitable for ink-jet printing. Therefore, the ink composition of the present invention preferably has a viscosity (20° C.) of 1 to 100 cP, a surface tension of $2 \times 10^{-2}$ to $6 \times 10^{-2}$ N/m, and a specific weight of 0.8 to 1.2.

The ink composition of the present invention for ink-jet printing may be prepared by mixing/stirring of the starting components, and filtering for purifying the mixture by means of a filter having a pore size about 1/10 or less of the nozzle size of the ink jet printer employed.

The ink composition of the present invention for ink-jet printing may be used with a variety of ink-jet printers; e.g., a charge controlling type ink-jet printer and a drop-on-demand type ink-jet printer. The ink composition of the present invention is suitably employed in printing by means of a large-format ink-jet printer; e.g., an ink-jet printer for printing outdoor articles such as sign displays. When the ink composition of the invention is employed in color graphic printing or printing from a video image, high-contrast images with remarkably high image reproducibility can be obtained.

After ink-jet-printing is performed, the printed surface (ink composition) on a substrate forms dry film by drying it at ambient temperature to several hundreds of degrees celsius. In the present invention, no particular limitation is imposed on the substrate on which the ink composition is printed, so long as the substrate is not deformed or decayed under the conditions where the printed surface (ink composition) is dried. Examples of such substrates include substrates made of metal, glass, or plastic material; resin-coated paper, transparent sheets for overhead projection; and outdoor articles such as sign displays.

By use of the ink composition of the present invention for ink-jet printing, clogging of nozzles of an ink-jet printer which would otherwise occur during printing is prevented. Therefore, a print of desired printing quality can be obtained, and an appropriate drying rate of printed images and excellent color development can be attained.

EXAMPLES

The present invention will next be described in more detail by way of Examples and Comparative Examples.

Examples 1 to 4 and Comparative Examples 1 to 3

Inks of Examples 1 to 4 and Comparative Examples 1 to 3 were prepared by kneading, by means of a sand mill, for three hours, respective mixtures containing components in respective amounts (parts by mass) shown in Table 1.

Specifically employed were Monarch 1000 (carbon black, product of Cabot Corp.), VYHD (vinyl chloride copolymer resin, product of Dow Chemical Co.), CAB-551-0.01 (cellulose ester resin, product of Eastman), Solsperse 37500 (polyester-polyamide resin (solid content: 40%), product of Avecia), and Disperbyk 167 (polyester-polyamide resin (solid content: 52%), product of Byk-Chemie).

The inks of Examples 1 to 4 and Comparative Examples 1 to 3 were analyzed in terms of viscosity, particle size, dispersion stability, nozzle clogging, and resistance to ethanol, through the following methods. These properties were evaluated according to the following ratings.
<Viscosity Measurement>
Measured by means of a B-type viscometer at 20° C.
<Particle Size Measurement>
Measured by means of a laser diffraction particle size distribution meter (SALD-7000, product of Shimadzu Corporation).
<Dispersion Stability>
Each ink was stored at 60° C. for one month. After storage, viscosity and particle size were determined and evaluated according to the following ratings.
A: Change in viscosity and change in particle size were ±5% or less after storage at 60° C. for one month.
B: Change in viscosity and change in particle size were more than 5% to 10% or less after storage at 60° C. for one month.
C: Change in viscosity or change in particle size was more than 10% after storage at 60° C. for one month.
<Nozzle Clogging>
A test image was obtained by means of a large-format ink-jet printer, and the obtained image was visually assessed. The print condition was evaluated according to the following ratings.
A: Successfully printed at intended sites.
B: Not printed at intended sites with print defects due to nozzle clogging.

<Resistance to Ethanol>

A test image was obtained by means of a large-format ink-jet printer, and the obtained image was rubbed with a piece of cloth impregnated with 50 mass % ethanol-water. The thus-treated image was visually assessed.

A: No change was observed.
B: Ink was partially removed.
C: Ink was removed to such an extent that the substrate was exposed.

The test results and evaluation are shown in Table 1.

TABLE 1

| Ink composition | Examples | | | | Comp. Exs. | | |
|---|---|---|---|---|---|---|---|
| | 1 | 2 | 3 | 4 | 1 | 2 | 3 |
| Carbon black | 4 | 4 | 4 | 4 | 4 | 4 | 4 |
| 2-Pyrrolidone | 20 | | 20 | 20 | | 82 | |
| γ-Butyrolactone | | 20 | | | | | |
| Methyl ethyl ketone | | | | | 20 | | |
| Dipropylene glycol monomethyl ether | 62 | 64 | 62 | | 62 | | 82 |
| Diethylene glycol ethyl methyl ether | | | | 62 | | | |
| Vinyl chloride copolymer resin | 6 | 6 | | 6 | 6 | 6 | 6 |
| Cellulose ester resin | | | 6 | | | | |
| Polyester-polyamide resin (Solsperse 37500) | 8 | | 8 | 8 | 8 | 8 | 8 |
| Polyester-polyamide resin (Disperbyk 167) | | 6 | | | | | |
| Viscosity (mPa·s) | 4.1 | 4.4 | 3.8 | 4.2 | 4.0 | 23.6 | 16.2 |
| Particle size (nm) | 99 | 103 | 101 | 95 | 98 | 186 | 162 |
| Dispersion stability | A | B | A | A | B | C | C |
| Nozzle clogging | A | A | A | A | B | B | B |
| Resistance to ethanol | A | A | B | A | B | B | C |

As is clear from Table 1, the inks of Examples 1 to 4 (according to the present invention) exhibited excellent performance in all the tests, indicating that these inks were excellent.

In contrast, the ink of Comparative Example 1 employing a solvent mixture falling outside the scope of the invention caused nozzle clogging and provided defective images. The ink of Comparative Example 2 employing only one species of the essential two solvents of the invention exhibited poor dispersion stability and caused clogging of nozzles, thereby providing defective images. The ink of Comparative Example 3 employing only the other species of the essential two solvents of the invention exhibited poor dispersion stability and poor resistance to ethanol and caused clogging of nozzles, thereby providing defective images.

Examples 5 to 8 and Comparative Examples 4 to 6

Ink compositions of Examples 5 to 8 and Comparative Examples 4 to 6 were prepared by kneading, by means of a sand mill for three hours, respective mixtures containing components in respective amounts (parts by mass) shown in Table 2.

Specifically employed were Nipex 1701Q (carbon black, product of Degussa), VYHD (vinyl chloride copolymer resin, product of Dow Chemical Co.), CAB-551-0.01 (cellulose ester resin, product of Eastman), Solsperse 32000 (polyester-polyamide resin (solid content: 100%), product of Avecia), and Disperbyk 9077 (polyester-polyamide resin (solid content: 99%), product of Byk-Chemie).

The ink compositions of Examples 5 to 8 and Comparative Examples 4 to 6 were analyzed in terms of viscosity, particle size, dispersion stability, clogging of nozzles, and resistance to ethanol, through the following methods. These properties were evaluated according to the aforementioned ratings. The test results and evaluation are shown in Table 2.

TABLE 2

| Ink composition | Examples | | | | Comp. Exs. | | |
|---|---|---|---|---|---|---|---|
| | 5 | 6 | 7 | 8 | 4 | 5 | 6 |
| Carbon black | 4 | 4 | 4 | 4 | 4 | 4 | 4 |
| Cyclohexane | 20 | | 20 | 20 | | 86 | |
| Isophorone | | 20 | | | | | |
| Methyl ethyl ketone | | | | | 20 | | |
| Propylene glycol monomethyl ether acetate | 66 | 66 | 66 | | 66 | | 86 |
| Ethylene glycol monobutyl ether acetate | | | | 66 | | | |
| Vinyl chloride copolymer resin | 6 | 6 | | 6 | 6 | 6 | 6 |
| Cellulose ester resin | | | 6 | | | | |
| Polyester-polyamide resin (Solsperse 32000) | 4 | | 4 | 4 | 4 | 4 | 4 |
| Polyester-polyamide resin (Disperbyk 9077) | | 4 | | | | | |
| Viscosity (mPa·s) | 4.0 | 4.2 | 3.9 | 4.2 | 3.8 | 4.9 | 3.0 |
| Particle size (nm) | 96 | 105 | 98 | 99 | 102 | 167 | 159 |
| Dispersion stability | A | B | A | A | B | C | C |
| Clogging of nozzles | A | A | A | A | B | B | B |
| Resistance to ethanol | A | A | B | A | B | B | C |

As is clear from Table 2, the inks of Examples 5 to 8 (according to the present invention) exhibited excellent performance in all the tests, indicating that these inks were excellent.

In contrast, the ink of Comparative Example 4 employing a solvent mixture falling outside the scope of the invention caused clogging of nozzles and provided defective images. The ink of Comparative Example 5 employing only one species of the essential two solvents of the invention exhibited poor dispersion stability and caused clogging of nozzles, thereby providing defective images. The ink of Comparative Example 6 employing only the other species of the essential two solvents of the invention exhibited poor dispersion stability and poor resistance to ethanol and caused clogging of nozzles, thereby providing defective images.

The invention claimed is:

1. An ink composition for ink-jet printing consisting of:
   a pigment in an amount of 0.1 to 15 mass%,
   a binder resin in an amount of 0.5 to 15 mass%,
   a pigment dispersant in an amount of 0.1 to 15 mass%, and
   a solvent in an amount of 60 to 99 mass%, wherein,
   the solvent consists of:
   (i) γ-butyrolactone in an amount of 1 to 45 mass%, and
   (ii) dipropylene glycol monoalkyl ether in an amount of 15 to 95 mass%,
   the binder resin is a vinyl chloride copolymer resin, and
   the pigment dispersant is a polyester-polyamide resin having two or more amido groups in the one molecule thereof and a number average molecular weight of 2,000 to 15,000.

2. The ink composition for ink-jet printing as described in claim 1, wherein the dipropylene glycol monoalkyl ether comprises dipropylene glycol monomethyl ether.

3. The ink composition for ink-jet printing as described in claim 1, wherein the pigment is present in an amount of 0.5 to 10 mass%.

4. The ink composition for ink-jet printing as described in claim 1, wherein the ink composition has a viscosity (20° C.) of 1 to 100 cP, a surface tension of $2 \times 10^{-2}$ to $6 \times 10^{-2}$ N/m and a specific weight of 0.8 to 1.2.

* * * * *